United States Patent

Haas et al.

[15] 3,687,515
[45] Aug. 29, 1972

[54] ELECTRO-OPTIC LIQUID CRYSTAL SYSTEM WITH POLYAMIDE RESIN ADDITIVE

[72] Inventors: Werner E. L. Haas, Webster; James E. Adams, Ontario; John B. Flannery, Jr., Webster, all of N.Y.

[73] Assignee: Xerox Corporation, Stamford, Conn.

[22] Filed: Jan. 6, 1971

[21] Appl. No.: 104,328

[52] U.S. Cl. ............ 350/150, 23/230 LC, 252/408, 350/160 LC
[51] Int. Cl. ........................ G02f 1/26, G02f 1/16
[58] Field of Search .......... 350/150, 160 P, 160; 23/230 LC; 252/408

[56] References Cited

OTHER PUBLICATIONS

Naggiar, Annales de Physique, Vol. 18, 1943, pp. 34-41.
Soref, Laser Focus, Vol. 6, No. 9, Sept., 1970, pp. 45-49.
Holzman, IBM Technical Disclosure Bulletin, Vol. 8, No. 1, June. 1965, pp. 151- 152.

*Primary Examiner*—David Schonberg
*Assistant Examiner*—Ronald J. Stern
*Attorney*—James J. Ralabate, David C. Petre and Roger W. Parkhurst

[57] ABSTRACT

An electro-optic system wherein a layer of nematic liquid crystalline composition which is optically uniaxial with the optic axis normal to the plane of the layer has an electrical field applied perpendicular to the optic axis of the composition layer thereby inducing optical biaxiality in the composition layer. Electro-optic cells and imaging systems are disclosed using the optic retardation accompanying a field induced change from the uniaxial to the biaxial state.

23 Claims, 4 Drawing Figures

PATENTED AUG 29 1972 3,687,515

INVENTORS.
WERNER E.L. HAAS
JAMES E. ADAMS
BY JOHN B. FLANNERY JR.

*Roger W. Parkhurst*
ATTORNEY

PATENTED AUG 29 1972　　　　　　　　　　　　　　3,687,515

ELECTRO-OPTIC LIQUID CRYSTAL SYSTEM WITH POLYAMIDE RESIN ADDITIVE

BACKGROUND OF THE INVENTION

This invention relates to electro-optic systems, and more specifically, to an electro-optic system wherein a nematic liquid crystalline electro-optic composition is used. Furthermore, this invention includes electro-optic cells and imaging systems embodying the inventive nematic liquid crystalline electro-optic system.

Recently, there has been substantial interest in the discovery of more useful applications for the class of substances known as "liquid crystals." The name "liquid crystals" has become generic to liquid crystalline materials which exhibit dual physical characteristics, some of which are typically associated with liquids and others which are typically unique to solids. Liquid crystals exhibit mechanical characteristics, such as viscosities, which are normally associated with liquids. The optical characteristics of liquid crystals are more similar to those characteristics ordinarily unique to crystalline solids. In liquids or fluids, the molecules are typically randomly distributed and oriented throughout the mass of the material. Conversely, in crystalline solids the molecules are generally rigidly oriented and arranged in a specific crystalline structure. Liquid crystals resemble solid crystals in that the molecules of the liquid crystalline compositions are regularly oriented in a fashion analogous to, but less extensive than, the molecular orientation and structure in a crystalline solid. Many substances have been found to exhibit liquid crystalline characteristics in a relatively narrow temperature range; below that temperature range the substance typically appear as crystalline solids, and above that temperature range they typically appear as liquids. Liquid crystals are known to appear in three different mesomorphic forms; the smectic, the nematic and cholesteric. In each of these structures, the molecules are typically arranged in a unique orientation. In the nematic liquid crystalline mesophase structure, the major axes of the molecules lie approximately parallel to each other, but the molecules are typically not specifically organized in any other fashion.

Nematic liquid crystals are known to be responsive to electrical fields, and have been used in various electro-optic cells and imaging systems, for example as disclosed in Williams U.S. Pat. No. 3,322,485, Freund et al, U.S. Pat. 3,364,433; Heilmeier et al., U.S. Pat. No. 3,499,112; and Goldmacher et al., U.S. Pat. No. 3,499,702. Most of the known nematic liquid crystalline light valves and display devices make use of the dynamic light scattering characteristics of layers of nematic liquid crystalline materials which have electrical fields placed across the thickness of the layer. The dynamic light scattering is believed to be due to the differential alignment of domains or swarms of birefringent liquid crystalline molecules in the electric field affected areas in such systems. However, in new and growing areas of technology such as liquid crystals, new methods, apparatus, compositions of matter and articles of manufacture continue to be discovered for the application of the new technology in new modes. The present invention relates to a new advantageous electro-optic system wherein the active member comprises a nematic liquid crystalline composition, and electro-optic cells and imaging systems using the inventive system.

SUMMARY OF THE INVENTION

It is, therefore, an object of this invention to provide a novel electro-optic system.

It is another object of this invention to provide a novel imaging system.

It is another object of this invention to provide a novel nematic liquid crystalline imaging system.

It is another object of this invention to transform an optically uniaxial nematic liquid crystalline composition to an optically biaxial nematic liquid crystalline composition by an electrical field applied normal to the optic axis of a layer of the nematic liquid crystalline composition.

It is another object of this invention to provide novel electro-optic cells and novel electro-optic imaging cells.

It is still another object of the invention to use the induced retardation which accompanies the change from the uniaxial to the biaxial state in novel electro-optic cells and imaging cells.

The foregoing objects and others are accomplished in accordance with this invention by an electro-optic system including an active layer comprising a nematic liquid crystalline composition which is initially optically uniaxial with the optic axis normal to the plane of the layer, wherein an electrical field is applied perpendicular to the optic axis of the layer of nematic liquid crystalline composition, whereby the nematic liquid crystalline composition becomes optically biaxial. Electro-optic cells and imaging systems using the optic retardation accompanying the electric field induced change from the uniaxial to the biaxial state are also a part of the present invention.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein.

DESCRIPTION OF THE PREFERRED EMBODIMENTS

Figure 1:
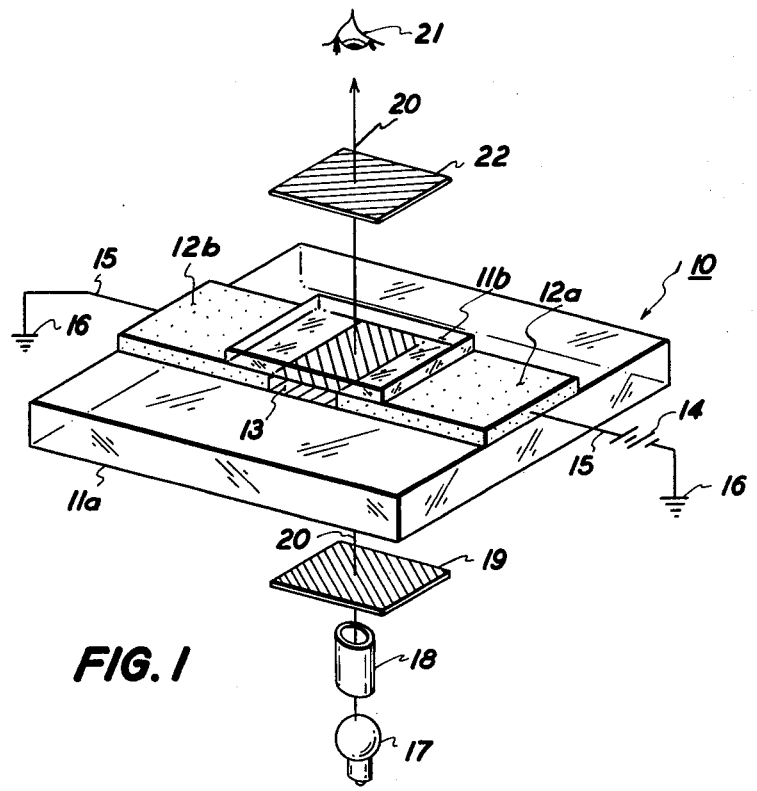
FIG. 1 is a partially schematic, isometric view of an electro-optic cell embodying the present invention.

In FIG. 1 an embodiment of the novel electro-optic cell 10 of the present invention is shown in partially schematic, isometric view. A pair of substantially transparent plates 11a and 11b are separated by a pair of electrodes 12a and 12b, and a layer of nematic liquid crystalline electro-optic composition 13 occupies the volume defined by the transparent plates 11 and electrodes 12. In some embodiments it may be desirable to use a strip of insulating gasket-type material to close the ends of this small volume which defines the layer of nematic liquid crystalline electro-optic composition, to contain the composition within the volume between the transparent plates and the electrodes. In operation, the cell is typically electrically connected to place an electrical field across the width, as distinguished from the thickness, of the layer of nematic composition, for example as here illustrated by source of potential difference 14, leads 15 and ground 16.

In the electro-optic cells described herein, the substantially transparent surfaces or plates 11 may comprise any suitable substantially transparent material. For example, glass; polyethylene; polyvinylchloride; Mylar, a polyester resin film available from DuPont; Teflon, a polytetrafluoroethylene film available from DuPont; or any other suitable substantially transparent material may be used.

The electrodes 12, which may also help define the volume between the substantially transparent surfaces 11 may comprise any suitable electrically conductive material. Such electrical conductors will typically have electrical resistivities in the range between about $10^{-8}$ and about $10^{-3}$ ohm-cm, although materials having resistivities outside this range will perform satisfactorily in various embodiments of the present invention. Typical conductive materials suitable for use as electrodes herein include aluminum, copper, silver, gold, tin oxide, and others. The thickness of the electrodes, that is the length of the dimension of the electrodes in the direction normal to the transparent surfaces, it typically not greater than about 250 microns. It is noted that this thickness also substantially defines the thickness of the layer of nematic composition which is included in the volume defined by the electrodes and the transparent surfaces. The individual cells in the present invention are typically of width not greater than about 20 millimeters. Within this range, wider cells are preferable for use as optical modulation elements, while narrow individual cells or combinations thereof are preferably for use in high resolution imaging or display systems.

Where it is desirable to use a strip of gasket-like material at the ends of the volume defined by the electrodes and the transparent surfaces, or in any other suitable fashion, any suitable substantially electrically insulating material may be used. Preferred gasket materials will typically be chemically inert, transparent, not birefringent, optically isotropic, and possess the appropriate dielectric characteristics. Materials suitable for use as insulating gasket materials include cellulose acetate, cellulose triacetate, cellulose acetate butyrate, polyurethane elastomers, polyethylene, polypropylene polyesters, polystyrene, polycarbonates, polyvinylfluoride, polytetrafluoroethylene, polyethylene terephthalate, mixtures thereof, and others.

Any suitable nematic liquid crystal, a mixture or composition comprising nematic liquid crystals, or composition having nematic liquid crystalline characteristics may be used in the electro-optic system of the present invention. Such nematic liquid crystalline materials include p-azoxyanisole, p-azoxyphenetole, p-butoxybenzoic acid, p-methoxy-cinnamic acid, butyl-p-anisylidene-p-aminocinnamate, anisylidene para-aminophenylacetate, p-ethoxy-benzylamino-a-methyl-cinnamic acid, 1,4-bis(p-ethoxy benzylidene) cyclohexanone, 4,4'-dihexyl-oxybenzene, 4,4'-diheptyloxybenzene, anisal-p-amino-azo-benzene, anisaldazine, a-benzeneazo- (anisal-$\alpha'$-naphthylamine), n,n'-nonaxybenzyltolnidine; anils of the generic group (p-n-alkoxybenzylidene-p-n-alkylanilines), such as p methoxy-benzylidene-p'-n-butylaniline; nematic compounds of the alkoxybenzylidene-aminoalkylphenone group, such as methoxybenzylidene-aminobutyrophenone and methoxybenzylidene-aminovalerophenone; mixtures of the above and others.

The above list of materials exhibiting nematic liquid crystalline characteristics is not intended to be exhaustive or limiting. The list discloses a variety of representative materials suitable for use in he electro-optic composition which comprises the active element in the advantageous system of the present invention.

The liquid crystalline materials may be prepared by dissolving the liquid crystals or mixtures thereof in any suitable solvent, for example organic solvents such as chloroform, trichloroethylene, tetrachloroethylene, petroleum ether, methyl-ethyl ketone, and others. The solution containing the liquid crystal material is then typically poured, sprayed or otherwise applied to a suitable transparent substrate. After evaporation of the solvent, a thin layer of liquid crystal remains. Alternatively, the individual liquid crystal materials of the liquid crystalline mixture can be combined, and applied directly by heating the mixed components above the isotropic transition temperature and mixing the components before application to a suitable substrate. Room temperature liquid crystals may be used in their natural room temperature condition. In the present invention such liquid solutions or compositions may alternatively be injected into position in the electro-optic cell. Many compositions suitable for use here may have viscosities such that the composition layer will have sufficient integrity to be self supporting on the substrate or in the cell, without the aforementioned gasket materials, regardless of the orientation of the cell.

The liquid crystal layers or films suitable for use in the present invention are preferably of a thickness in the range of about 250 microns or less, although thicker films will perform satisfactorily in some embodiments of the inventive system. When the nematic liquid crystalline electro-optic composition is placed between substantially transparent surfaces or the surfaces of two parallel members, as in various embodiments of the present invention, it has been found that the nematic composition has a tendency to become spontaneously aligned between the transparent plates with the optic axis of the composition normal to the plane of the transparent plates, or normal to the plane of the layer of nematic composition itself. The layer of composition adopts the nematic homoeotropic texture, wherein the optic axis is normal to the plane of the layer. The nematic homoeotropic texture is further described in Gray, G.W., *Molecular Structure in the Properties of Liquid Crystals*, Academic Press, London, 1962.

It is also found that the liquid crystal layers or films of the present invention are more readily spontaneously aligned when the liquid crystalline composition is doped with a small amount of a surfactant additive. For example polymeric resin dopants, such as Versamid 100, a polyamide resin available from General Mills, Inc.; and other Versamid resins such as Versamid 115, 125, and 140, added to the liquid crystalline composition in amounts in the range between about 0.1 and about 10 percent, facilitate the spontaneous alignment which is desired in the present invention.

In operation, the advantageous system of the present invention, for example as embodied in FIG. 1, has an electrical field placed across the layer of nematic electro-optic composition in the direction normal to the optic axes of the layer. As illustrated in FIG. 1, the field may be applied by connecting a source of potential difference 14 across electrodes 12a and 12b. Although a D.C. electrical source is used for purposes of illustration in FIG. 1, it should be understood that any suitable source of electrical potential, either A.C., D.C., or combinations thereof, is suitable for use in the inventive system. The surprising change from the optically uniaxial state to the optically biaxial state, and the accompanying optic retardation which gives rise to increased transmissivity of collimated light through the nematic liquid crystalline composition layers between crossed polarizers is increasingly observable as a function of the electrical field strength applied across the width of the composition. Any suitable field strength up to about 3,500 volts/cm. of width, which is approximately the threshold of dynamic scattering in such nematic materials, may be used in the inventive system. Field strengths of not greater than about 1,500 volts/cm. of width are preferred, because the desired result is more uniform where field strengths in this range are used.

The surprising and advantageous effect of the present invention is typically observed by providing a source of collimated light, ere illustrated as source 17 and collimator 18, in a position normal to the plane of the layer of nematic electro-optic composition (i.e. parallel to the optic axis of the composition). The collimated light is then passed through a polarizer 19 and the plane polarized light, here transmitted along line 20, enters the cell parallel to the optic axis of the layer of nematic imaging composition. In the absence of the electrical field, an observer 21, on the opposite side of the novel electro-optic cell, observing the cell in the direction normal to the plane of the electro-optic composition and parallel to the normal optic axis, will observe that the field of view is extinguished for all orientations of the polarizer and analyzer. After application of the field as described herein, the observer sees that the field of view is extinguished only if the direction of the field is parallel to the direction of vibration (direction of polarization) of either the polarizer or the analyzer, which are typically crossed at about 90° to one another. In changing the orientation of the polarizer and the analyzer with respect to the electrical field (i.e., by rotating the polarizer and analyzer about the axis 20), it is observed that extinction of the transmission of collimated light from source 17 occurs 4 times throughout a complete 360° revolution of the system. It is also observed that maximum transmission occurs if the field direction is at an angle of about 45° from the direction of vibration of the polarizer or analyzer. At other times, the sample transmits light substantially uniformly, and transmission of light is increased with increasing fields within the desired field strength ranges of the present invention.

The surprising and advantageous electro-optic effect of the present invention, as described above, results from the fact that the layer of nematic electro-optic composition which initially has the optic axis normal to the plane of the layer of the composition, under the influence of the electrical fields as described herein, is transformed to an optically biaxial condition wherein the plane polarization of the incoming collimated light is disturbed, thereby allowing the nematic electro-optic composition to transmit light even when observed between a crossed polarizer and analyzer. The birefringence induced by the electric field is extraordinarily large.

Initially, the color of the transmitted light is white, like that emanating from the source 17; however, as the field strength is increased, uniform interference colors become visible. In this way it is seen that the present system may even by suitable for use as a color, electro-optic cell or imaging system, where the color is controlled by the strength of the applied field.

It will be appreciated that the advantageous effect and system of the present invention is particularly suited for use as a light valve or shutter where it is desirable to modulate or chop a beam of collimated light. As described above, by rotation of the angle between the applied electrical field and the polarizer and analyzer combination, the degree of transmission of such a beam may be modulated or extinguished. While the dimensions of a layer of nematic composition which may be used in the advantageous system of the present invention may preferably be somewhat small, it should be appreciated that an electro-optic cell of any desired area may be made suitable for use embodying the advantageous system of the present invention by providing adjacent incremental areas across which electric fields may be applied to cause the advantageous transmission effects of the present invention across the entire integrated area, or any desired portion thereof.

Figure 2:
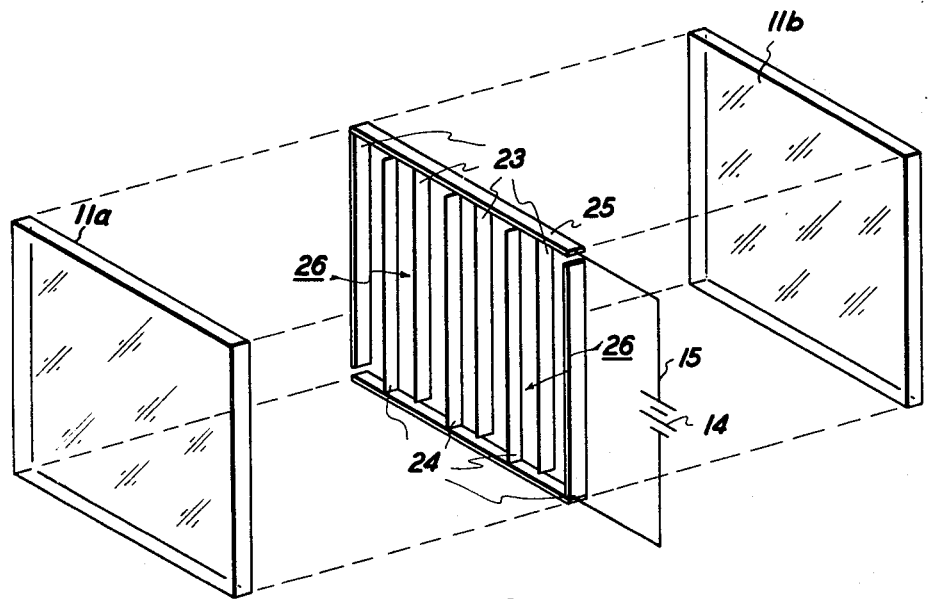
FIG. 2 is a partially schematic, exploded isometric view of an electro-optic cell which uses the system of the present invention.

For example, in FIG. 2 another embodiment of the present invention is shown in partially-schematic, exploded isometric view wherein substantially transparent surfaces or plates 11a and 11b sandwich a set of electrodes 23 and 24. The electrodes in each of these sets are electrically connected at one end, for example as illustrated by the conductive member 25 contacting the electrodes 23 of the 23 set. Each of the electrodes 23 and 24 is a substantially planar strip of electrically conductive material which is oriented between transparent plates 11 so that the planes of the electrodes 23 and 24 are substantially normal to the surfaces 11a and 11b. In this way, the surfaces 11 and electrodes 23 and 24 define a series of small volumes 26 which are typically filled with the nematic electro-optic imaging composition suitable for use in the present invention. The two sets of electrodes 23 and 24 are electrically connected to sources of opposite polarity electrical potential, for example as illustrated here across source of potential difference 14 through leads 15, thereby providing electrical fields with lines of force approximately normal to the optic axis of the nematic electro-optic composition, which is in the layer configuration confined between the transparent surfaces 11 and the electrodes 23 and 24, in the volumes 26. It will be appreciated that the distances between adjacent opposite polarity electrodes 23 and 24 are distances within the ranges suitable for providing electrical fields of the desired electrical field strengths suitable for use in producing the advantageous effect of the present invention. Although only nine electrodes 23 and 24 are illustrated in FIG. 2 as the set which comprises the larger integrated area electro-optic cell of the present invention, it will be appreciated that in this or in a similar manner, any desired area may be made suitable for use as an electro-optic light valve or shutter using the advantageous system of the present invention. Of course polarizing sheets suitable for use as the polarizer and analyzer may be used externally in conjunction with such light valves as described in conjunction with FIG. 1 above.

In still other embodiments, the advantageous system of the present invention may be provided in large area, individually addressable bit-matrix systems so that each bit may be individually activated to transmit light in accordance with the present invention. In this way, a full area imaging system or cell which makes use of the advantageous system of the present invention may be provided.

Figure 3:
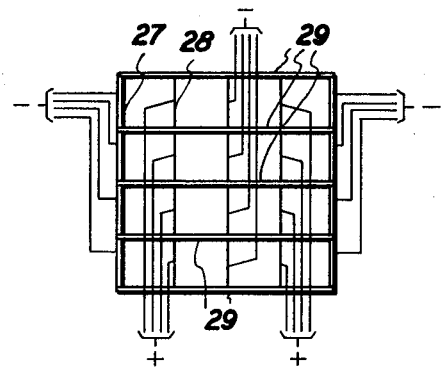
FIG. 3 is a partially schematic, face view or two-dimensional view, of an imaging system embodying the present invention.

FIG. 3 illustrates in a partially schematic, two dimensional face view, such a selectively addressable imaging system wherein the individual pairs of electrodes 27 and 28 are separately electrically connected to sources of opposite electrical potential, and the leads for each cell are brought together in an electrical address system wherein the desired electrical field may be provided across any individual bit or cell or any desired combination of individual bits or cells in order to provide the novel effect of the present invention across any desired combination of bits or cells in the matrix, thereby imaging the larger surface area comprising the entire bit-matrix imaging system. The electrical address system used in conjunction with the coplanar, multiple cell system of FIG. 3, may comprise any means for selectively activating one or more of the individual cells to activate any desired combination thereof. For example a bank of individual switches, or switches for activating defined combinations of cells, or switches for activating a defined series of defined combinations of cells in a defined sequence (such as systems used with existing displays such as scoreboards, marque lighting displays, etc.), may be used. It will be appreciated that polarizing sheets may be used in conjunction with this large area system as described in conjunction with FIGS. 1 and 2. In this way, light may be imagewise transmitted through such a full area imaging system in order to display light images on dark backgrounds.

Figure 4:
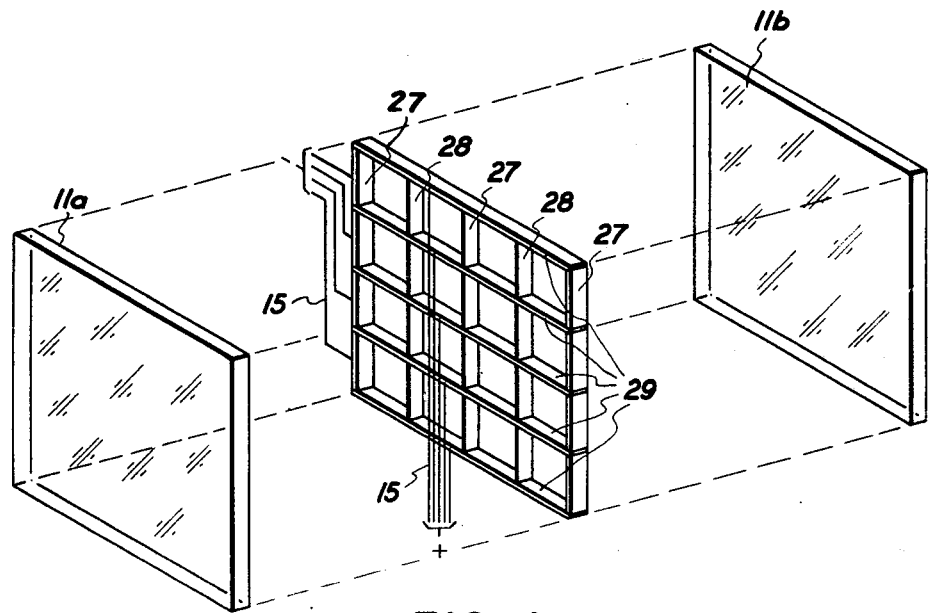
FIG. 4 is a partially schematic, exploded isometric view of the imaging system described in FIG. 3.

The multiple-bit, planar imaging system of FIG. 3 is further illustrated in partially schematic, exploded isometric view in FIG. 4 wherein the matrix of imaging cells or bits is provided between surfaces or substantially transparent plates 11a and 11b. In this embodiment it is clearly illustrated that the individual electrodes 27 and 28 are provided for addressing individual bits or portions of the entire surface area of the imaging system, and that each bit of the total area is separated by an electrode 27 or 28 and one or more insulating strips 29. Although exemplary leader connecting wires 15 are here illustrated as randomly oriented connecting the individual electrodes 27 and 28 to their respective sources of opposite polarity electrical potential, it will be appreciated that such leads may be introduced along substantially electrically insulating members 29 or along the lines of intersection between the strip electrodes 27 and 28 with the transparent surfaces 11a and 11b, in order to minimize the interference of the connecting wires with the desired image area in the advantageous system of the present invention. The individual electrodes 27 and 28 are intended to be substantially planar strips of electrically conductive material which are oriented perpendicular to the plane of the surfaces 11a and 11b. As described in conjunction with the other embodiments of the present invention, polarizers or polarizing sheets may be used as the polarizer and analyzer combination through which light is transmitted in the inventive system.

Although individual electro-optic cells or valves have been described in conjunction with FIGS. 1 and 2, and grids or bit-matrices of coplanar electro-optic cells embodying the present invention are described in FIGS. 3 and 4, it will be appreciated that in various embodiments hereof individual electro-optic cells exhibiting the novel effect of the present invention may be arranged in any suitable configuration to provide any desired image or configuration for any display or electro-optic purpose.

The following examples further specifically define the present invention with respect to a nematic liquid crystalline electro-optic cell and imaging system wherein a nematic electro-optic composition is transformed from an optically uniaxial state to an optically biaxial state by the application of an electrical field applied perpendicularly across the optic axis of the composition. The parts and percentages are by weight unless otherwise indicated. The examples below are intended to illustrate various preferred embodiments of the novel nematic liquid crystalline electro-optic system.

EXAMPLE I

A nematic liquid crystalline electro-optic cell is provided by placing a pair of aluminum strips having square cut ends on a standard microscope slide and adjusting the square ends of the strips so that they are about 4 millimeters apart. The aluminum strips are of thickness of about 15 microns. In the space between the aluminum electrode strips on the substrate slide, a layer of p-methoxy-benzylidene-p'-n-butylaniline (hereafter ABUTA) is provided, and is leveled to about the thickness of the aluminum electrodes by placing a standard microscope cover slide over the layer of nematic liquid crystalline electro-optic composition. The nematic composition assumes the nematic homeotropic texture wherein the optic axis of the composition layer is aligned normal to the plane of the layer. This imaging cell is then placed under a Leitz Dialux microscope between crossed polarizers. In parallel or collimated transmitted light, the all appears dark in all stage positions, and in convergent light the conoscopic figure is a uniaxial cross. The optic sign of the composition is positive, i.e., light travels fastest in the direction of the optic axis.

A D.C. field of about 200 volts/cm. is applied to the sample, and during the application of the field the transmitted light is extinguished only if the direction of the field, which is normal to the line of transmission and parallel to optic axis of the layer of electro-optic composition, is parallel to the direction of vibration of either the polarizers or the analyzer. It is observed that during rotation of the microscope stage through 360°, the extinction occurs 4 times. Maximum transition is observed to occur when the field direction is at an angle of about 45° from the direction of vibration of the polarizer or analyzer, which are crossed at about 90°. The sample is observed to transmit light uniformly and transmission increased with increasing electrical fields. Initially, the color of the transmitted light is white, but as the field strength is increased uniform interference hues become visible. Field reversal does not effect the result. When the electric field strength exceeds about 1,500 volts/cm. of sample width, the sample uniformity decreases. At higher fields of about 3,500 volts/cm. of sample width, dynamic scattering is observed to occur.

As stated above, in convergent light the conoscopic figure is clearly uniaxial before the application of the field. The interference figure is exceptionally sharp. The application of the D.C. field results in the breaking of the uniaxial figure, and when the film is observed in the 45° position (electrical field direction of about 45° to the direction of vibration of the polarizer or analyzer) two hyperbolic isogyres are seen, the separation of which increases with field strength.

EXAMPLE II

A nematic liquid crystalline electro-optic cell is provided as described in Example I, however in this cell the nematic composition is doped with about 0.5 percent Versamid 100, a polyamide resin available from General Mills, Inc.. The dopant enhances the spontaneous alignment of the composition to the nematic homoeotropic texture.

EXAMPLE III

A nematic liquid crystalline electro-optic cell is provided as described in Example I, however in this cell the nematic composition is methoxybenzylidene-amino-butyrophenone (MBAB). This cell exhibits electro-optic effects as described in Example I.

EXAMPLE IV

A nematic liquid crystalline electro-optic cell is provided as described in Example III, however the nematic composition is doped with about 2.0 percent Versamid 115, a polyamide resin available from General Mills, Inc. The dopant enhances the spontaneous alignment of the composition to the nematic homoeotropic texture.

EXAMPLE V

A nematic liquid crystalline electro-optic cell is provided as described in Example V, however the nematic composition is doped with about 3.0 percent Versamid 125, a polyamide resin available from General Mills, Inc. The dopant enhances the spontaneous alignment of the composition to the nematic homoeotropic texture.

Although specific components and proportions have been stated in the above description of the preferred embodiments of the advantageous nematic liquid crystalline electro-optic system of the present invention, other suitable materials and variations of the various steps in the system as listed herein may be used with satisfactory results and various degrees of quality. In addition, other materials and steps may be added to those used herein and variations may be made in the process to synergize, enhance or otherwise modify the properties of or uses for the invention. For example, various other nematic liquid crystalline compositions which will undergo the induced optical biaxiality and exhibit the accompanying optic retardation may be discovered and used in the system of the present invention and such compositions may require somewhat different thicknesses, electrical fields, temperature ranges and other conditions for preferred results in accordance with the present invention. Likewise, various other means of creating electrical fields and other means of addressing the inventive imaging system may be used with satisfactory results.

It will be understood that various changes in the details, materials, steps and arrangement of elements which have herein be described and illustrated in order to explain the nature of the invention, will occur to and may be made by those skilled in the art, upon a reading of this disclosure and such changes are intended to be included within the principle and scope of this invention.

What is claimed is:

1. An electro-optic method comprising:
   providing a layer of nematic liquid crystalline composition including from about 0.1 percent to about 10 percent by weight of a polyamide resin, said nematic composition aligned with its optic axis approximately normal to the plane of said layer, and
   providing an electrical field across the nematic liquid crystalline composition normal to the direction of the initial optic axis of said composition, whereby said nematic liquid crystalline composition assumes a field-induced optically biaxial state.

2. The method of claim 1 wherein the layer of nematic liquid crystalline composition contacts a supporting surface.

3. The method of claim 1 wherein the layer of nematic liquid crystalline composition contacts two approximately parallel surfaces of at least two substantially transparent members.

4. The method of claim 1 wherein said layer is of a thickness not greater than about 250 microns.

5. A method of claim 1 wherein the width of said layer in the direction normal to the direction of the optic axes is not greater than about 20 millimeters.

6. The method of claim 1 wherein said electrical field is of a field strength not greater than about 3,500 volts/cm. of width of the nematic liquid crystalline composition.

7. The method of claim 1 wherein said electrical field is of a field strength not greater than about 1,500 volts/cm. of width of the nematic liquid crystalline composition.

8. The method of claim 1 wherein the layer of nematic liquid crystalline composition is observed between polarizers in transmitted light.

9. The method of claim 8 wherein the light is collimated before transmission into the first polarizer.

10. The method of claim 8 wherein said polarizers are crossed at an angle of about 90°.

11. The method of claim 10 wherein the direction of the electrical field makes an angle of about 45° with the direction of vibration of the polarizers.

12. The method of claim 1 wherein the nematic liquid crystalline composition comprises a compound selected from the group consisting of p-methoxybenzylidene-p'-n-butylaniline; methoxybenzylidene-amino-butyrophenone; methoxybenzylidene-aminovalerophenone; and mixtures thereof.

13. The method of claim 1 wherein the electrical field is of strength sufficient to produce interference hues in the composition layer and said electrical field is varied to provide various interference hues corresponding to different electrical field strengths.

14. The method of claim 1 wherein said electrical field is provided across the nematic liquid crystalline composition by a pair of electrodes located at opposite edges of the composition layer.

15. The method of claim 14 wherein said electrodes are of a thickness not greater than about 250 microns.

16. An electro-optic display apparatus comprising a plurality of individual cells, said individual cells comprising a layer of electro-optic composition comprising nematic liquid crystalline composition including from about 0.1 percent to about 10 percent by weight of a polyamide resin between two approximately parallel surfaces of at least two substantially transparent members, and a pair of electrodes at two opposite edges of said layer of electro-optic composition, and means for selectively providing an electrical field between the electrodes of at least one of the individual cells.

17. The apparatus of claim 16 wherein the thickness of the layer of electro-optic composition is not greater than about 250 microns.

18. The apparatus of claim 16 wherein the distance between the electrodes in the individual cells is not greater than about 20 millimeters.

19. The apparatus of claim 16 wherein the electrodes of the plurality of individual cells are arranged parallel to each other.

20. The apparatus of claim 16 wherein the surfaces of the individual cells are coplanar.

21. The apparatus of claim 20 additionally comprising polarizers on the opposite surfaces of the coplanar cells, and a source of collimated light oriented so that the collimated beam provided by said source is approximately normal to the coplanar surfaces of the display apparatus.

22. The apparatus of claim 21 wherein said polarizers are crossed at an angle of about 90°, and the electrodes of the plurality of individual cells are arranged parallel to each other, and the direction of the electrodes and the direction of vibration of the polarizers cross at an angle of about 45°.

23. The apparatus of claim 22 wherein the means for selectively providing an electrical field between the electrodes of at least one of the individual cells, is capable of providing an electrical field of field strength not greater than about 3,500 volts/cm. across the width of any one of or any combination of any of the plurality of individual cells.

* * * * *